Figure 1:
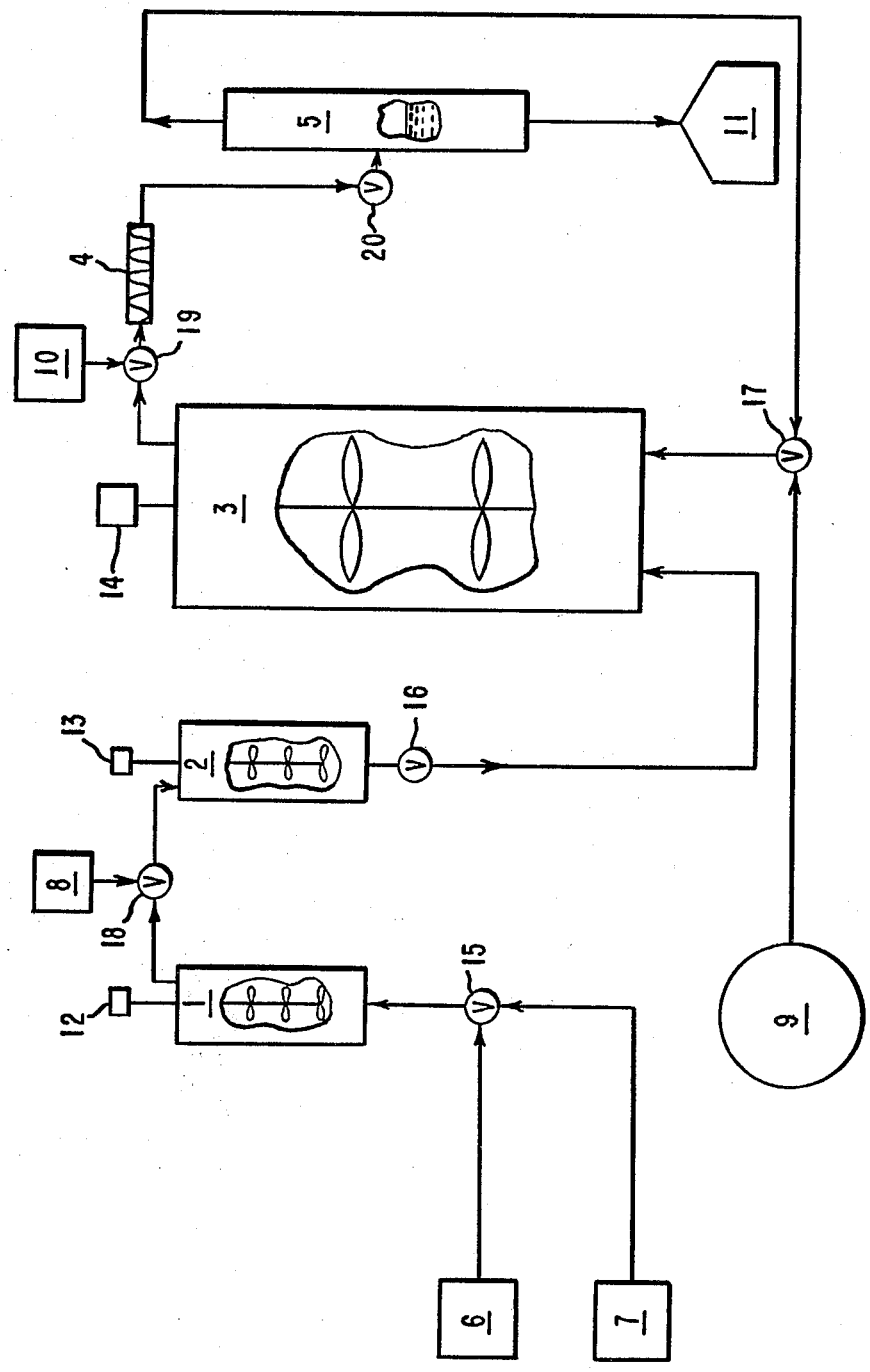

United States Patent [19]
Setterquist

[11] 3,971,767
[45] July 27, 1976

[54] OLEFIN POLYMERIZATION CATALYST SYSTEM AND PROCESS FOR POLYMERIZATION OF OLEFINS

[75] Inventor: Robert Alton Setterquist, Wilmington, Del.

[73] Assignee: E. I. Du Pont de Nemours and Company, Wilmington, Del.

[22] Filed: July 30, 1975

[21] Appl. No.: 600,295

Related U.S. Application Data

[62] Division of Ser. No. 471,811, May 20, 1974.

[52] U.S. Cl. .................................. 526/65; 526/82; 526/154; 526/160; 526/349; 526/351; 526/352

[51] Int. Cl.² .................... C08F 2/06; C08F 4/02; C08F 4/76

[58] Field of Search............... 260/88.2 R, 88.2 F, 260/93.7, 94.9 B, 94.9 DA

[56] References Cited
UNITED STATES PATENTS

| | | | |
|---|---|---|---|
| 3,635,935 | 1/1972 | Long | 260/94.9 B |
| 3,681,317 | 8/1972 | Pioli et al. | 260/94.9 B |
| 3,712,874 | 1/1973 | Kruse | 260/94.9 D |
| 3,840,508 | 10/1974 | Ballard et al. | 260/94.9 DA |
| 3,840,511 | 10/1974 | Ballard et al. | 260/94.3 |
| 3,875,132 | 4/1975 | Kruse | 260/94.9 B |

Primary Examiner—Alan Holler

[57] ABSTRACT

There are disclosed a novel class of catalysts for olefin polymerization, processes for the production of this class of catalysts and processes for the production of linear polyolefins, including linear polyethylene, linear polypropylene and linear copolymers of ethylene with higher olefins, using this class of catalysts. The new class of catalysts comprises Group IV(a) transition metal hydrocarbyl hydride aluminates supported on alumina. The catalysts are produced by reacting a tetra(hydrocarbyl) transition metal compound $[(R-CH_2)_4-M$ in which R is aryl, aralkyl or tertiary alkyl, and M is Ti, Zr or Hf] with partially hydrated (0.5 to 1.5% water of hydration) alumina to produce hydrocarbyl-transition metal aluminates on alumina followed by hydrogenation until from about 60% to 100%, preferably 90% to 100%, of the hydrocarbyl groups have been displaced and partially replaced by hydride, and the valence state of the transition metal has been reduced. The catalysts are of exceptionally high activity for the polymerization of olefins, and the catalyst residues are innocuous and do not need to be removed from the resultant polymers.

12 Claims, 1 Drawing Figure

OLEFIN POLYMERIZATION CATALYST SYSTEM AND PROCESS FOR POLYMERIZATION OF OLEFINS

This is a division of application Ser. No. 471,811, filed May 20, 1974.

I. BACKGROUND OF THE INVENTION

1. Field of the Invention

This invention relates to a unique group of catalysts of remarkable activity for the polymerization of 1-olefins and to an improved process for the polymerization of olefins to provide linear polymers and copolymers, said process employing the improved catalyst system comprising a Group IV(a) transition metal hydrocarbyl hydride aluminate bonded to the surfaces of alumina for use therein, and to the process for production of the improved catalyst. More specifically, this invention relates to a process for the homopolymerization and copolymerization of ethylene, propylene, butene-1 and higher 1-olefins in which the catalyst system is the product obtained by the reaction of a tetra(hydrocarbyl) transition metal compound, $(R\text{-}CH_2)_4M$, where M is Ti, Zr or Hf and R— is an aryl, aralkyl or tertiary alkyl group which contains no H-radical attached to the carbon atom in the $\beta$-position to the metal, M, with a partially hydrated alumina followed by hydrogenation of the adduct to a preselected degree prior to injection into a polymerization zone where the catalyst, usually suspended in an inert hydrocarbon medium, is contacted with the olefin or olefins to be polymerized.

2. Prior Art

In 1954 and 1955 pioneering advances in olefin polymerization catalysts were disclosed by Karl Ziegler and associates at the Max-Planck Institute for Coal Research in Muelheim, Germany, and by Arthur Anderson and associates in the laboratories of E. I. du Pont de Nemours and Company in Wilmington, Delaware. These new catalyst systems, now frequently termed coordination catalysts, were based on transition metal salts (e.g. titanium, zirconium or vanadium halides) which had been converted into reduced valence states by reaction with a variety of alkylating or arylating substances, usually simple organometallic compounds of a metal of Groups I, II or III of the Periodic Table of Elements (the Bohr long form). It is believed that the mechanism of catalyst production involves alkylation (or arylation) of the transition metal halide followed by rapid decomposition of the unstable, transitory transition metal-alkyl (or aryl) compounds to give more stable complex products of lower valency which actively coordinate with and polymerize olefins by a coordination-polymerization mechanism. Unlike the commercial polyethylene or any polypropylene previously known prepared by free-radical or ionic catalysts, polyolefins prepared with coordination catalyst are of very high molecular weight and linear and highly ordered, thus exhibiting, in the case of homopolymers, such a high degree of chemical structural regularity and linearity that they are highly crystalline and exhibit high crystalline melting points, making them extremely valuable as textile fibers, films, and molded articles of commerce. Generally, however, it has been necessary in the case of these coordination catalysts to device processes to remove the catalyst residues, which comprised the transition metal halides, since the residues were present at such levels as to discolor the polymer and the halide was too corrosive to subsequent fabrication machinery.

More recently some more stable organometallic transition metal complexes, usually including a halide anionic ligand or a neutral Lewis Base ligand, have been disclosed in patents of Gunther Wilke of the Max-Planck Institute and in patents of several researchers in the laboratories of I.C.I. in England, and in several patents of researchers in the laboratories of Hercules, Inc. in the United States.

Illustrative of the Wilke patents are U.S. Pat. Nos. 3,379,706, 3,424,777, 3,432,530, 3,540,728, 3,468,921 and 3,536,740. In all of these Wilke patents the hydrocarbyl groups attached to a transition metal are members of the class of $\pi$-allylic compounds characterized by the structure

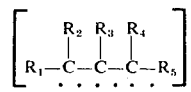

in which the R-radicals may be H- or any alkyl, aryl or aralkyl radicals or $R_1$ and $R_4$ may together form a ring comprising methylene groups. Interactions between the $\pi$ electrons and the electrons of the transition metal presumably occur affecting the stability and chemical reactivity of the complexes. The bonding of these $\pi$-allyl radicals to the transition metal is more stable than in the case of sigma-bonded n-alkyl groups but less stable than for the hydrocarbyl groups employed in the catalysts of the present invention which have no H-radicals attached to the C-atom beta to the metal. These metal-$\pi$-allyl compounds are reacted with Lewis acids, such as HX, where X is halide, or Lewis Bases, such as tertiary amines or phosphines, to form complexes showing activity as olefin oligomerization or polymerization initiators. However, polymerization reactions using such initiators generally must be conducted as slurry polymerizations at low temperatures, because of marginal thermal stability and low solubility of the $\pi$-allyl complexes, and have been found less than fully satisfactory in the yields and molecular weight of polymers produced. Furthermore, because of their corrosive and often toxic nature, the catalyst residues must be removed from the polymeric products by time-consuming and costly procedures in order to provide products of general utility and safety in commerce.

One improvement on the use of these $\pi$-allylic transition metal complex catalysts in olefin polymerization is disclosed in U.S. Pat. No. 3,732,198 of Whitely et al., assignors to I.C.I., who disclose the polymerization of ethylene with a combination of a classical coordination catalyst with a transition metal complex of a $\pi$-allylic compound.

The patents arising from the work of researchers at I.C.I. in England are illustrated by U.S. Pat. Nos. 3,681,317, 3,740,384, 3,738,944 and British Patent No. 1,314,828. All of these involve tetrabenzyl-transition metal compounds (e.g. tetrabenzyl zirconium) complexed with anionic ligands (e.g. halide) and/or neutral ligands (e.g. pyridine) as ethylene polymerization catalysts. In certain cases there are disclosed as ethylene polymerization catalysts the reaction products of tetrabenzyl-zirconium compounds with inorganic oxides free of absorbed water but containing surface HO— groups. Reasonable thermal stability is achieved with these substances. They apparently yield high molecular weight polyethylene but the polymerization rate and efficiency and polymer yield obtained with those catalysts in processes operating at short hold-up times ization medium is passed back as recycle to the polymerizer, 3.

The catalyst deactivator from reservoir 10 can be an alcohol, steam, $CO_2$ or other polar composition reactive with the transition metal catalyst. The traces of deactivated catalyst are removed from the polymer separator incorporated with the polymer from which they need not be removed because of the low level and inert nature of this innocuous catalyst residue.

V. DESCRIPTION OF PREFERRED EMBODIMENTS

The tetra(hydrocarbyl)-transition metal compounds employed to produce the catalysts of this invention by reaction with partially hydrated aluminas followed by hydrogenation are compounds of the formula $(R-CH_2)_4M$ where M is a transition metal of Group IV(a) of the Periodic Table of The Elements according to Bohr (see T. Moeller, "Inorganic Chemistry", page 122) (e.g. Ti,Zr or Hf) and R is an aryl, aralkyl or tertiary alkyl group. Examples include tetra(benzyl)zirconium, tetra(neopentyl)zirconium, tetra(neophyl)zirconium, tetra(neophyl) titanium, tetra(benzyl) titanium, tetra(neopentyl) titanium, tetra(neophyl)hafnium, etc.

The preferred catalysts, in a process for the polymerization of ethylene and/or other 1-olefins, are zirconium benzyl hydride aluminate or zirconium neophyl hydride aluminate supported on and bonded to fumed alumina having a surface area in the range of 10 to 500 m²/g, as measured by $N_2$ adsorption. These are preferred even when substantially 100% of the hydrocarbyl groups originally attached to zirconium have been replaced by hydride since it has been found that the zirconium hydride aluminate on alumina will vary in activity depending upon the structure of the original hydrocarbyl groups; it is believed that these observed differences occur because differences in the size and nature of the hydrocarbyl groups affect the distribution and positioning of the zirconium on the alumina surfaces. The activity is also affected by the surface condition of the fumed alumina prior to reaction with $(R-CH_2)_4-Zr$. Prior to injection of the catalyst, in an inert hydrocarbon solvent, into the polymerization zone, the zirconium has a reduced valency, at least in part at the Zr(III) valence state although some Zr(II) and Zr(IV) may also be present.

The polymerization process is preferably carried out in an inert, substantially anhydrous hydrocarbon medium. The temperature employed may range from about 50°C. to 300°C., depending on the monomer or monomers to be polymerized and upon whether a slurry or a solution polymerization process is to be used. In the case of the polymerization of ethylene, either homopolymerization or copolymerization with other olefins, the preferred temperature is in the range of 130°–270°C. where a single phase, solution polymerization process occurs at maximum rates and high efficiency (yield of polymer per unit of zirconium catalyst). Propylene is preferably polymerized at lower temperatures in the range of 50° to 150°C. although higher temperatures can be employed.

The pressure employed is not critical so long as it is sufficient, at the temperature chosen, to prevent boiling of the hydrocarbon solvent and maintain the monomers employed in solution in the solvent. Thus the pressure may range from atmospheric to 5,000 psi and above at the highest temperatures of operation of the process.

The process employed for the preparation of the catalyst is a critical aspect of the invention. In order to achieve optimum activity it is preferred that an alumina having a surface area of 10 to 500 m²/g, free from absorbed water but containing hydroxyl groups generally randomly distributed on its surfaces be employed. Preferably this alumina support is most readily produced by activation of fumed alumina (a product obtained by burning aluminum chloride in the presence of water vapor) by heating in a stream of dry $N_2$ at temperatures in the range of 900°–1100°C. for a period in the range of 1 to 10 hours. This treatment not only removes water and residual chloride from the fumed alumina but alters the morphology of the crystalline alumina from predominantly gamma-alumina to a particular mixture of the gamma-, delta-, theta- and alpha-forms. The resultant mixture of crystalline forms is observed when obtaining, in the subsequent reactions with zirconium tetra(hydrocarbyl) and partial hydrogenation of that composition, the unique chemical composition of the zirconium hydrocarbyl hydride aluminate necessary to produce the optimum catalyst which exhibits the unexpected and surprising activity and efficiency characteristic of the polymerization process of this invention. However, other crystalline forms of alumina will provide catalysts which do polymerize olefin. Generally the presence of surface defects in the alumina is noted and it is likely they are associated with producing active sites for polymerization.

The fumed alumina, activated as described above, is then subjected to partial hydration by contact with an atmosphere comprising some water vapor until a minor proportion of water has reacted with the alumina surfaces, conveniently about 3% to 5% by weight water of hydration. This rehydrated alumina may then be partially dehydrated by heating at a temperature in the range of 300° to 500°C. for from 1 to 10 hours, the time required being in the lower portion of the range at the higher temperatures in the range of temperatures. The final product contains from 0.5% to 1.5% water as HO-groups distributed on the surfaces of the alumina. This second heat treatment not only assures that no merely absorbed molecular $H_2O$ remains on the surfaces of the alumina but also eliminates any large clusters of HO-groups on the surfaces leaving randomly distributed on the $Al_2O_3$ surfaces pairs and relatively isolated HO-groups as reaction sites. Alumina in which additional internal hydration exists can also be used to produce the catalysts so long as the surface HO-groups as described above are also present, but no advantage accrues from this, and at elevated temperatures such excessive hydration may be determined to catalyst activity.

The catalyst precursor is next prepared by mixing together a suspension of the activated, hydroxylated alumina in anhydrous mineral oil with a solution in hydrocarbon solvent of a tetra(hydrocarbyl) transition metal compound, preferably either tetrabenzyl zirconium or tetraneophyl zirconium, the latter being preferred because of its greater solubility in alkane solvents and ease of preparation. In general, the proportion of tetra(hydrocarbyl) transition metal compound employed is at least 0.05 millimoles per gram of $Al_2O_3$, preferably 0.15 to 0.35 millimoles per gram $Al_2O_3$. Up to 0.6 millimoles of the transition metal compound, and even larger proportions, are operable but provide no advantage since they provide no enhancement of catalyst activity.

The reaction between the tetra(hydrocarbyl) transition metal compound and hydroxylated alumina can be conducted at room temperature or above (20° to 50°C. is suitable). Upon mixing the suspension of alumina with the solution of tetra(hydrocarbyl) transition metal compound, a reaction occurs between the HO-groups on the surfaces whereby M-O-Al chemical bonds are formed with the elimination of approximately 2.5 of the 4 hydrocarbyl radicals originally bonded to the transition metal. The reaction may be approximately described by the equation (A):

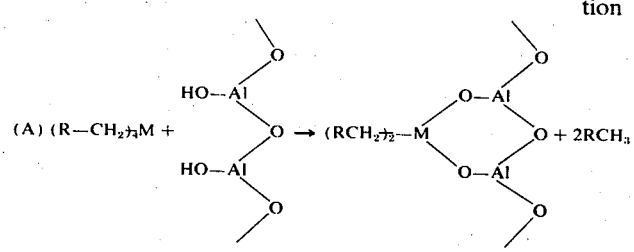

where R—CH$_2$— is, e.g.:

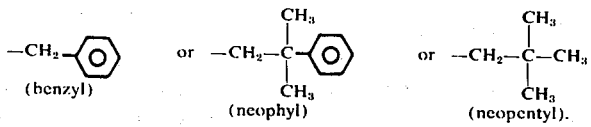

The product still contains the transition metal primarily in the tetravalent state. So long as protected from moisture and light, these reaction products in hydrocarbon suspensions are relatively stable indefinitely at room temperatures. These products are effective per se as olefin polymerization catalysts but are several fold less active than the novel catalysts of this invention.

It is preferable to integrate the final steps in the preparation of the novel catalyst of this invention with the olefin polymerization process. First the reaction product obtained as shown in Equation (A) is subjected to an aging step by warming the hydrocarbon suspension at a temperature in the range of 40° to 60°C., usually 50°C. It appears that this aging permits some chemical rearrangements in the original product including, inter alia, such changes as illustrated by the following Equation (B):

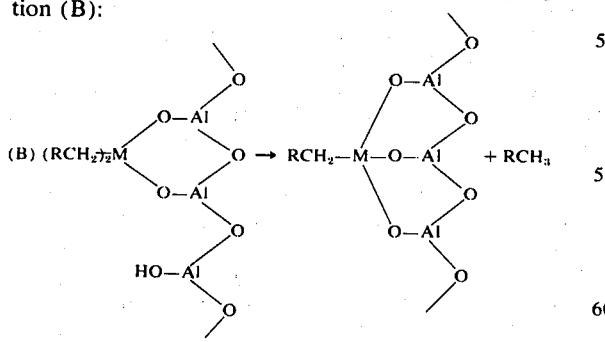

There may also occur some spontaneous decomposition to reduce a small proportion of the transition metal to the trivalent and divalent states with the hydrocarbyl radicals picking up protons from the hydrocarbon medium.

In the final step of the preparation of the novel catalyst of this invention, the aged suspension of precursor is subjected to hydrogenation which, depending upon the temperature and time, will cause up to substantially 100% of the hydrocarbyl radicals attached to the transition metal to be displaced by H-radicals with concomitant reduction of the valency of the transition metal. In the final hydrogenated catalyst, a portion of the transition metal is in the trivalent state but some can be divalent. This product, which is herein designated as a transition metal hydrocarbyl hydride aluminate, is the novel, exceptionally active and efficient catalyst for olefin polymerization.

The hydrogenation, carried out in the inert hydrocarbon medium, may be conducted at a temperature in the range of 25° to 300°C., preferably 50°–175°C., for a period of from about 0.1 to 30 minutes, depending upon the temperature and the extent of reduction and hydrocarbyl displacement desired for the subsequent olefin polymerization process. Depending upon the olefins to be polymerized or copolymerized, the temperature and hold-up time in the polymerization zone, and the type of grade of polyolefin that it is desired to produce, the hydrogenation should be conducted long enough to cause from about 60% to about 100% of the hydrocarbyl radicals originally attached to the transition metal to be displaced by hydride radicals and to assure reduction of the valency of the transition metal. In addition to reduction, some rearrangements can occur. The reactions which occur can be approximately represented by the following Equation (C):

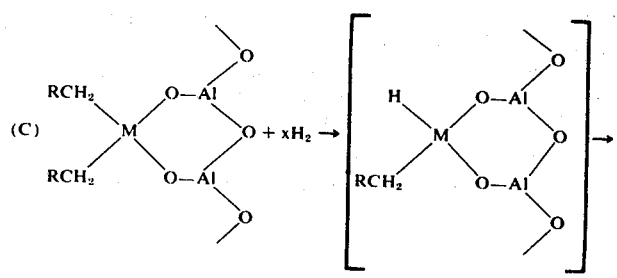

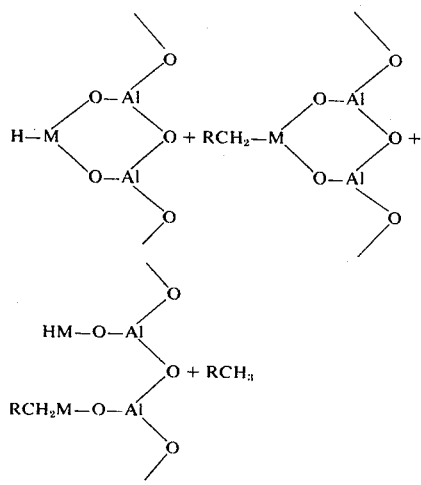

Further hydrogenation will displace still more of the hydrocarbyl radicals. Obviously, other structures are also present prior to the hydrogenation reaction so no single equation fully describes this process nor shows all of the chemical structures of the resulting catalyst which is herein termed a "transition metal hydrocarbyl hydride aluminate" on the surfaces of the alumina. The hydrides will have somewhat different structures and activities depending upon the choice of tetra(hydrocarbyl)transition metal compound reacted with alumina, since the bulkiness of the hydrocarbyl-radicals affects structure of the reaction products with alumina.

It has been found that it is essential to react the tetra(hydrocarbyl)transition metal compound with the hydroxylated alumina support prior to hydrogenation in order to achieve a highly active catalyst. It appears that the chemical attachment of the transition metal to the alumina through the oxygen linkage prevents spontaneous collapse or decomposition of the M-H bonding formed upon hydrogenation. Furthermore, it is essential in order to obtain the highly active catalyst of this invention that hydrogenation be carried out prior to contacting the catalyst precursor with an olefin in order to achieve the highly active and efficient polymerization catalyst, although, in the polymerization process, additional $H_2$ can be added with the olefin monomer in the polymerization zone where it then acts to control or limit the molecular weight of the resultant polymer. For this latter purpose, preferably 0.001–10 moles of $H_2$ per mole of ethylene is sufficient, although some effect can be achieved with lesser proportions.

In the ethylene polymerization process of this invention when conducted using zirconium hydrocarbyl hydride aluminate in continuous manner in a stirred autoclave, the yields obtained are in the range of 900–20,000 kg polyethylene per mole of zirconium, depending upon the choice of hydrocarbyl radical and scale of operation. Inherently, batch processes are less efficient but yields in the range of 300 to 500 kg. polyethylene per mole of zirconium per hour are readily obtainable as compared with only 50–100 kg. polyethylene per mole Zr per hour obtained in a process of the prior art where there is used as catalyst the reaction product of tetrabenzyl zirconium with hydrated $Al_2O_3$ which has not been hydrogenated prior to introduction into the polymerization zone.

In the preferred continuous process, the catalyst suspension and the ethylene dissolved in an aliphatic or cycloaliphatic hydrocarbon are both fed continuously to the stirred polymerization zone, the molar ratio of ethylene fed to transition metal being maintained in the range of 35,000 to 400,000 to one.

The polyolefins obtained by the process of this invention are linear, head-to-tail polymers of high molecular weight. In the case of ethylene homopolymerizations, the resultant linear polyethylene has a crystalline melting point in the range of 133°–138°C. and an annealed density in the range of 0.96 to 0.97 g./cm³. If desired, ethylene polymers of lower density (0.90–0.96 g./cm³) can be obtained by copolymerization of ethylene with minor proportions (0.5 to 15 mole %) of higher 1-olefin monomers (preferably $C_4$ to $C_{10}$) to provide copolymers containing higher olefin using the process and catalyst of this invention. Such copolymers contain randomly-distributed side-chains of controlled length which impede somewhat the development of crystallinity in the solid polymers and as a result provide polymers of increased toughness and stress-crack resistance. As is well known, all of these high molecular weight ethylene polymers find commercial use as self-supporting films, wire-coatings pipe, and molded articles of commerce. If desired, they can be filled by mixing with glass or other stiff fibers, clays and the like to produce hard, stiff moldings.

The homopolymerization of propylene using the catalyst of this invention in the process of this invention can be directed, by control of process conditions, to yield highly stereoregular, head-to-tail crystalline polypropylene of high molecular weight insoluble in hydrocarbons at ambient temperatures and sparingly soluble even at temperatures above 100°C. and having a crystalline melting point in the range of 162°–170°C., as determined by either differential thermal analysis or hot-stage microscope using polarized light, as well as high molecular weight, linear head-to-tail polypropylene which is amorphous, due to atactic steric structure, and soluble in hydrocarbons even at room temperature. The crystalline polypropylene has come to be termed, following the suggestion of Giulio Natta, polypropylene exhibiting "isotactic" structure due to the presence of long segments in the macromolecules in which the groups attached to successive asymmetric carbon atoms along the chains have the same configuration. As is well known, crystalline polypropylene finds many commercial uses, particularly as textile fibers, in both woven and non-woven textiles and as films, strapping, coatings and molded articles of commerce. Amorphous polypropylene is useful in blends with crystalline polyolefins to provide toughness and in adhesive compositions and rubbers.

The catalyst and process of this invention can be used to produce substantially amorphous ethylene/propylene rubbers where from about 30% to about 70% by weight (preferably about 50% by weight) of ethylene and, correspondingly, 70% to 30% of propylene are combined in the macromolecules by copolymerization, under constant environment conditions, of ethylene and propylene. Due to the higher reactivity of ethylene in the polymerization reaction, a higher proportion of propylene should be used in the monomer feed to the polymerization zone than it is desired to incorporate in the copolymer macromolecules. If desired to provide ready sites for subsequent traditional chemical vulcanizations (cross-linking), minor proportions of unconjugated dienes (e.g. 1,4-hexadiene, 2-methyl-1,5-hexadiene, etc.) may be included in the copolymers by including minor proportions of these diene monomers in the mixture of monomers fed to the polymerization zone in the process. Rubbers can also be obtained by the homopolymerization of conjugated diolefins such as butadiene or isoprene using the catalyst and process of this invention. The properties and utilities of these synthetic rubbers are well known in the rubber industry.

Because the process of this invention uses such an active and efficient catalyst system, the very low level of catalyst residues in the polyolefin products produce no adverse effects on the properties of these polymers. Therefore, the polymers are used as formed without the necessity of the expensive and complex catalyst removal procedures customarily employed in connection with prior art commercial practice.

The following examples are provided to illustrate the invention and to provide comparative examples closer to the more relevant prior art. However, the invention is not to be considered as limited to the particular examples provided but rather is of the scope hereinabove described and hereinafter claimed.

Example 1. Batch Polymerization of Ethylene With Optimum Catalyst a. Preparation of the Alumina 65 g. of a commercially-available fumed alumina having a surface area of 100 m²/g was charged to a vertical reactor and dried at 1000°C. in a stream of flowing nitrogen for 5 hours and in a stream of flowing air for 1 hour. The fumed aluminum was partially rehydrated at 73°F. in a 50% r.h. atmosphere for 16 hours and then redried by heating to 400°C. for 4 hours in a flowing stream of dry nitrogen. The resultant partially-hydrated alumina contained approximately 0.5% by weight water as HO-groups. This partially-hydrated but dry alumina was suspended under N₂ atmosphere in 1700 cc. of mineral oil containing 85 cc. of petroleum jelly and stored until used.

b. Preparation of Catalyst

The catalyst was prepared by adding 2 g. tetra(benzyl) zirconium dissolved in 50 cc. of benzene to 600 cc. of the mineral oil suspension of alumina, prepared as in (a) above, at 25°C. The suspension was thickened by addition of 50 cc. of white petroleum jelly and a 10 cc. aliquot of the resultant product, which comprised the reaction product of 0.3 g. alumina and 0.063 millimoles (calculated to include the dilution with petroleum jelly) of tetra(benzyl) zirconium, was injected into a 500 cc. crown capped bottle containing 200 cc. of decahydronaphthalene at 150°C. under a hydrogen atmosphere. The hydrogen pressure was then rapidly raised to 20 psi and maintained there for 20 minutes at 150°C. while stirring the slurry to drive the hydrogenation to substantial completion (>98% displacement of benzyl radicals by H-radicals attached to zirconium). Thereupon unreacted H₂ was vented and the resultant catalyst used without isolation for the polymerization of ethylene.

c. Polymerization of Ethylene

Ethylene at 40 psi was injected into the crown capped bottle containing the stirred zirconium benzyl hydride aluminate on alumina catalyst slurry maintained at 150°C. It was observed by pressure drop that polymerization of ethylene commenced immediately; additional ethylene was injected as required to maintain the pressure in the polymerization vessel at 40 psi for 12 minutes at 150°C. The injection of ethylene was then stopped, the vessel vented of excess ethylene and the remaining contents poured into 500 cc. of methanol to deactivate the catalyst and precipitate the polymer. The solid polymer product was chopped with methanol in a blender, separated and washed with 500 cc. of cyclohexane at room temperature, recovered by filtration and dried at 80°C. for 72 hours at 0.008 atm pressure in a vacuum oven. The weight of recovered solid polyethylene was 2.47 g. The rate of polymer formation was 172 g./millimole zirconium/hr.

Example 2. Polymerization of Ethylene with Partially-Hydrogenated Catalyst.

a. Preparation of Catalyst 10 cc. of the suspension of activated, hydrated alumina suspension prepared as in Example 1 was mixed at 25°C. with 0.2 millimoles of tetra(benzyl) zirconium dissolved in 1 cc. of toluene. The resultant reaction product, benzyl zirconium aluminate supported on alumina, was introduced into a 500 cc. heavy-walled Pyrex crown capped bottle containing 200 cc. of dry, de-oxygenated decahydronaphthalene at 150°C. under a flow of hydrogen at approximately 2 psi. The zirconium benzyl hydride aluminate on alumina catalyst was formed by stirring the suspension at 150°C. under 2 psi H₂ pressure for 20 minutes.

b. Polymerization of Ethylene

Ethylene at 40 psi was injected into the stirred suspension of catalyst maintained at 150°C. An immediate increase in viscosity of the stirred reaction mixture was noted. Ethylene was continuously injected to maintain the pressure at 40 psi. After 12 minutes at 150°C., the flow of ethylene was stopped, unreacted ethylene was vented from the bottle and the remaining contents poured into 500 cc. of methanol. The solid polymer product was separated by filtration and washed first with 500 cc. of cyclohexane and then with 500 cc. of methanol. The solid polymer was dried at 80°C. in a vacuum oven for 16 hours. The dried polyethylene weighed 2.1 g. and had a crystalline melting point of 130°C., as determined by differential thermal analysis. The rate of polymer formation in this case was 45 g./millimole zirconium/hr., indicating that it was less active than in the case of Example 1 due to the somewhat less than 98% degree of hydrogenation achieved at lower $H_2$ pressure during the preparation of the catalyst.

Example 3. Comparative Polymerization of Ethylene With a Benzyl Zirconium Aluminate on Alumina Catalyst.

The benzyl zirconium aluminate on alumina catalyst precursor was prepared as in Example 2. The resultant suspension was then heated at 150°C. under $N_2$ (rather than $H_2$) in 200 cc. of dry, de-oxygenated decahydronaphthalene for 20 minutes. The heat-treated suspension was then used to initiate the polymerization of ethylene injected at 40 psi over a 12-minute period at 150°C. as described in Example 2. The solid polyethylene product, recovered, washed and dried as in Example 2, weighed 1.1 g. In this case the rate of polymer formation was only 20 g./millimole zirconium/hr., substantially less than for the hydride catalyst of Example 2.

Example 4. comparative Polymerization of Ethylene With a Benzyl Zirconium Aluminate on Alumina Catalyst.

Ethylene was polymerized according to Example 1 except that a 10 cc. portion of the suspension in mineral oil of benzyl zirconium aluminate on alumina was heated at 150°C for 20 minutes under $N_2$ instead of the $H_2$ used in Example 1. After the heat treatment, the suspension was used immediately to polymerize ethylene under 40 psi ethylene pressure as in Example 1. After recovery and drying, the solid polyethylene obtained weighed 1.04 g. The rate of polymer formation was 58.6 g./millimole zirconium/hr., only about a third of the rate observed in Example 1.

A repetition of this experiment for the polymerization of ethylene using again the mineral oil suspension of benzyl zirconium aluminate on alumina of Example 1 as catalyst without prior hydrogenation or preheating under $N_2$ at 150°C. yielded under the same polymerization conditions of Example 1, 1.66 g. of solid polyethylene after recovery and drying. The rate of polymer formation in this case was 108 g./millimole zirconium/hr., the maximum I have achieved with a catalyst approaching more nearly the type generally disclosed in British Patent No. 1,314,828.

Example 5. Comparative Polymerization of Ethylene Employing Zirconium Borohydride Supported on Alumina.

An activated fumed alumina support prepared according to Example 1(a) was coated with zirconium borohydride by mixing 0.4 mM of zirconium borohydride dissolved in 1 cc. of toluene with 0.32 g. of the partially hydrated alumina suspended in 10 cc. of mineral oil. The suspension of coated alumina in mineral oil was charged to a 500 cc. crown capped bottle containing 200 cc. of decahydronaphthalene and the resulting slurry was heated with stirring at 150°C. for 20 minutes under 20 psi hydrogen. It was noted that the slurry darkened. Hydrogen then was vented from the bottle and ethylene at 40 psi admitted. Polymerization of ethylene commenced at once and additional ethylene was charged to maintain the ethylene pressure at 40 psi. After 12 minutes at 150°C., the flow of ethylene to the vessel was stopped, the vessel was opened, and the contents poured into 500 cc. of methanol. The solid polyethylene product was recovered by filtration and washed first with methanol and then with cyclohexane. After drying at 80°C. for 16 hours the weight of dry polyethylene produced was found to be only 0.89 g.

Example 6. Continuous Polymerization of Ethylene Using a Zirconium Benzyl Hydride Aluminate on Alumina Catalyst.

Activated, partially hydrated fumed alumina was prepared as described in Example 1(a). A solution of 5.81 g. (0.0127 M) of tetra(benzyl) zirconium dissolved in 100 cc. of benzene was reacted with 1314 g. of a stirred suspension in mineral oil of the alumina containing 3.88% by weight of the alumina by mixing with vigorous stirring in a 2 liter vessel (FIG. I, 1) under an atmosphere of flowing $N_2$. After a period of vigorous stirring, 100 cc. of medium consistency white petrolatum was added to thicken the suspension. Ash analysis of the resulting suspension showed that it contained 3.51% by weight solids.

The suspension was fed continuously into a stirred stainless steel autoclave of 975 cc. capacity (FIG. I, 2) at a rate of 19.7 cc./hr. (equivalent to 0.69 g./hr. $Al_2O_3$ and 0.17 millimoles zirconium/hr.). Simultaneously $H_2$ was fed to this autoclave at a rate of 7.35 millimoles/hr.; the $H_2$ was fed from a reservoir (FIG. I, 8) as a solution in cyclohexane at a rate of 2589 cc./hr. The autoclave was maintained at 150°C. under 2000 psi pressure. The average hold-up time of the suspension in this hydrogenation autoclave was 20 minutes.

From the hydrogenation autoclave, the suspension of supported catalyst was fed directly to a stirred polymerization autoclave made of stainless steel (FIG. I, 3) and maintained at 250°C. under 2000 psi pressure. Ethylene, as a 6% by weight solution in cyclohexane, was fed continuously from a reservoir (FIG. I, 9) to the polymerization autoclave at a rate of 200 g./hr. ethylene. $H_2$ was fed continuously to the polymerization autoclave at a rate of 103 millimoles/hr. as a 0.09027 M solution in cyclohexane. The hold-up time of the reactants and catalyst in the polymerization autoclave was an average of approximately 2.5 minutes.

The contents of the polymerization autoclave were continuously discharged through valve system to a deactivation chamber (FIG. I, 4) and there mixed with a 0.00333 M solution of isopropanol in cyclohexane added from a reservoir (FIG. I, 10) to the effluent from the polymerizer at a rate of 600 cc./hr. The isopropanol served to deactivate the catalyst and terminate the polymerization.

The hot solution of polymer was discharged from the deactivation chamber through an automatic controlled pressure-reducing valve (FIG. I, 20) into a product receiver (FIG. I, 5) maintained at 25°C.; the polyethylene precipitated and was separated from the liquid polymerization solvent medium by filtration in a product recovery system (FIG. I, 11). The supernatant polymerization medium can be recycled, through a purification train not shown in FIG. I, to the polymerizer.

The solid polyethylene, stll wet with cyclohexane, was chopped in a blender, washed with cyclohexane and dried in a vacuum oven at 80°C. for 16 hours. The yield of dried solid polyethylene was 941 kg./mole of zirconium. During steady state operation over a period of several hours, the rate of polymer production was 160 g./hr.

The dried polyethylene had a melt flow of 5.95 decigrams/min., as determined by ASTM Method 1238, Condition E. The density of the solid, linear polyethylene was measured to be 0.963 g./cc. by ASTM D792-64T (Method A, corrected to 23°C.).

Example 7. Continuous Polymerization of Ethylene Using As Catalyst Zirconium Neophyl Hydride Aluminate on Alumina.

Activated and partially hydrated fumed alumina was prepared as in Example 1(a) except that the activation was conducted for 6 hours at 1000° under $N_2$ flow instead of 5 hours under $N_2$ and 1 hour under air.

The activated alumina was suspended in mineral oil as in Example 6 and reacted with a solution of tetra(neophyl)zirconium [otherwise known as tetra(2-methyl, 2-phenylpropyl) zirconium]. The reaction was brought about by continuously feeding a 0.000625 M solution of tetra(neophyl)zirconium in n-hexane at a rate of 480 cc./hr. and a suspension of the activated fumed alumina fed at a rate of 1.2 g./hr. into a stainless steel, stirred autoclave of 974 cc. capacity maintained at 50°C. After an average hold-up time of 40 minutes, the reaction product (neophyl zirconium aluminate on alumina) was fed continuously to a 300 cc. stainless steel, stirred autoclave where it was hydrogenated by mixing with 54 millimoles/hour of $H_2$ dissolved in n-hexane fed at a rate of 1200 cc. of solution/hr. This hydrogenation autoclave was maintained at 125°C. and the suspension of catalyst on alumina remained in the hydrogenation autoclave for an average hold-up time of 5.3 minutes. Laboratory analysis of similarly treated hydride showed that more than 95% of the neophyl groups originally present on the supported catalyst precursor had been displaced by $H_2$ by this hydrogenation.

The suspension of zirconium neophyl hydride was fed continuously from the hydrogenation vessel to a 300 cc. stainless steel, agitated polymerization autoclave maintained at 250°C. under a pressure of 2250 psi. Ethylene was continuously fed to the polymerizer at a rate of 200 g./hr. as a 4% solution in n-hexane.

After an average hold-up time of 1.5 minutes the reactants were passed from the polymerization autoclave to a deactivation chamber, as in Example 6 where the effluent was continuously mixed with a 0.0033M solution of isopropanol in n-hexane added at a rate of 600 cc./hr. to the hot solution of polymer exiting the polymerizer. This deactivated the catalyst and terminated the polymerization.

The hot solution of polymer was transferred through an automatic controlled pressure reducing valve into a product receiver maintained at 50°C. where the solid polyethylene precipitated. The solid polyethylene was recovered by filtration and, while wet with hexane, chopped in a blender, washed with n-hexane and dried in a vacuum oven at 80°C. for 6 hours. The yield of solid, linear polyethylene was 540 kg./mole of zirconium, even at this low hold-up time. The rate of polymer formation over a period of several hours was 162 g./hr. The dried polyethylene had a melt flow of 0.4 decigram/min., as determined by ASTM 1238, thus showing that the polymer produced in the polymerizer in the absence of added $H_2$ was of substantially higher molecular weight than that produced in Example 6 where $H_2$ was added to the polymerizer to limit and control molecular weight.

Example 8. Batch Polymerization of Ethylene Using As Catalyst Zirconium Neopentyl Hydride Aluminate On Alumina.

Activated and partially hydrated fumed alumina prepared as in Example 7 was suspended in mineral oil and reacted with tetra(neopentyl)zirconium. The reaction was brought about in a 30 cc. crown capped vial under $N_2$ by reacting 10 cc. of the alumina suspension containing 0.32 g. of alumina with 1.5 cc. of a 0.067 M solution of tetra(neopentyl)zirconium in a 1 to 2 toluene:Decalin decahydronaphthalene solution. The reaction product was hydrogenated by heating the slurry in the presence of hydrogen at 20 psi for 20 min. at 150°C. Hydrogenation turned the slurry dark, indicative of reduction of the zirconium to less than its maximum valence state. The hydrogenated reaction mixture was cooled and used to catalyze the polymerization of ethylene directly.

The polymerization of ethylene was brought about by adding 6 cc. of the dark hydrogenated catalyst slurry (0.052 millimoles Zr, 0.17 g. $Al_2O_3$) to a crown capped pressure bottle containing 170 cc. of Decalin decahydronaphthalene saturated with ethylene at 40 psi. Polymerization ensued immediately. After 3 min. the polymerization was terminated by the addition of 2 cc. of isopropanol to the reaction mixture. The polymer was allowed to precipitate, isolated by filtration, disintegrated in a blender, washed 3 times with cyclohexane and dried in a vacuum oven at 80°C. for 16 hrs. There was recovered 0.64 g. of polyethylene. The rate of polymer formation was 169 g./millimole Zr./hr.

This experiment for the polymerization of ethylene was repeated using again a mineral oil suspension of the neopentyl zirconium aluminate except that 0.32 g. of catalyst containing 0.213 millimoles of zirconium without prior hydrogenation or preheating was added to 150 cc. of decahydronaphthalene saturated with ethylene at 40 psi. After 6 min. the polymerization was stopped and 1 g. of polyethylene was recovered after recovery and drying. The rate of polymerization was only 32 g./millimole Zr/hr. which is considerably less than obtained with the zirconium neopentyl hydride aluminate on alumina catalyst.

Example 9. Comparative Activity of Zirconium Hydride Aluminate on Alumina and Zirconium Aralkyl Aluminate on Alumina as Catalysts for the Polymerization of Ethylene in a Continuous Process.

a. Polymerization of Ethylene with Zirconium Benzyl Hydride Aluminate on Alumina Catalyst An activated alumina prepared and suspended in mineral oil as in Example 7 was reacted with a solution of tetra(benzyl)zirconium. The reaction was brought about by continuously contacting a 0.0009 M solution of tetra(benzyl)zirconium in n-hexane at a rate of 440 cc./hr. with a suspension of the activated fumed alumina fed at a rate of 1.33 g./hr. in a stainless steel stirred autoclave of 974 cc. capacity at approximately 50°C. The reaction mixture was diluted with hexane to yield an average hold-up time of 32–42 minutes in the autoclave. The reaction product was passed continuously into a 300 cc. stainless steel stirred autoclave where it was hydrogenated by mixing with 10.3 millimole/hr. of hydrogen in n-hexane fed at a rate of 1200 cc./hr. The temperature of the hydrogenation was maintained at 175°C. and the suspension of catalyst on alumina remained in the hydrogenation autoclave for an average hold-up time of 6 minutes.

The suspension of reduced zirconium benzyl hydride aluminate on alumina was fed directly to a 300 cc. polymerization autoclave maintained at 250°C. under a pressure of 2250 psi. Ethylene was fed to the polymerizer at a rate of 200 g./hr. as a 4% solution in n-hexane. The concentration of catalyst in the polymerization autoclave was $3.0 \times 10^{-5}$ Molar with respect to zirconium.

After an average hold-up time of 1.53 minutes, the reactants were passed from the polymerization autoclave to the deactivation chamber as in Example 6 where the effluent was continuously mixed with a 0.0033 M solution of isopropanol in n-hexane added at a rate of 600 cc./hr. The hot solution of polymer was transferred through an automatic controlled pressure reducing valve into a product receiver at approximately 50°C. where the solid polyethylene was recovered. The polyethylene was chopped in a blender, washed with n-hexane, and dried as in Example 7. The rate of polymer formation was 169.6 g./hr. (84.8% conversion of ethylene fed to the polymerizer).

b. Polymerization of Ethylene Using a Zirconium Benzyl Aluminate on Alumina Without Hydrogenation as a Catalyst The foregoing experiment (Example 9-a) was repeated using as a catalyst the reaction product of the activated alumina and tetra(benzyl)zirconium without hydrogenation prior to introduction into the polymerization autoclave except that the concentration of zirconium was increased slightly to $3.3 \times 10^{-5}$ Molar in the polymerization autoclave and the hold-up time of the reactants in the polymerization autoclave was decreased to 1.25 minutes. In this instance the rate of polyethylene formation decreased to 127.4 g./hr. (63.7% conversion of the ethylene feed).

A kinetic analysis of the reactions based on the change in the rate of polymerization ($k$) as shown by $$k = \frac{1}{[C]} \quad \frac{Q}{1-Q} \quad \frac{1}{\tau}$$

where
[$C$] = catalyst concentration in the polymerization
$\tau$ = hold-up time in the polymerization
$Q$ = ethylene conversion
reveals $k$'s for hydrogenated catalyst of $1.22 \times 10^5$ min$^{-1}$ Mole$^{-1}$ vs. only $0.43 \times 10^5$ min$^{-1}$ Mole$^{-1}$ for the unhydrogenated catalyst; or a 280% increase in the activity of the catalyst as a result of hydrogenation prior to contact with ethylene.

Example 10. Batch Polymerization of Ethylene Using as a Catalyst Zirconium Neophyl Hydride Silicate on Silica.

20 g. of a commercially-available fumed silica having a surface area of 225 m$^2$/g. was charged to a vertical reactor and dried at 200°C. in a stream of nitrogen for 4 hours.

The catalyst was prepared by hydrogenation of the product formed by adding 1 g. of the dried silica to 38.5 cc. of decahydronaphthalene and contacting the slurry formed with 1.5 cc. of 0.2 Molar tetra(neophyl)zirconium in benzene. The hydrogenation was brought about by heating the tetra(neophyl)zirconium-silica reaction product for 20 minutes at 100°C. under 40 psi hydrogen pressure.

Polyethylene was prepared by adding 4 cc. of the zirconium neophyl hydride silicate on silica catalyst slurry to a crown capped bottle containing 340 cc. of decahydronaphthalene saturated with ethylene at 150°C. and 40 psi. After 3 min. the polymerization was terminated by the addition of 2.0 cc. of isopropanol. The polymerization medium was cooled, the polymer precipitated, separated by filtration, washed with cyclohexane and methanol and dried in a vacuum oven at 80°C. for 16 hrs. The weight of recovered polymer was 0.36 g. The rate of polymer formation was 240 g./millimoles Zr/hr. This should be compared with the results obtained in Example 14 where alumina, instead of silica, was used as the support and three times this rate of polymerization was observed.

Example 11. Batch Polymerization of Ethylene Using as a Catalyst Zirconium Neophyl Hydride Titanate on Titania.

20 g. of commercially-available fumed titania having a surface area of 50 m$^2$/g. was charged to a vertical reactor and dried at 400°C. in a stream of nitrogen for 4 hrs.

The catalyst was prepared in the same fashion as Example 10 by reacting the titania with tetra(neophyl)zirconium and hydrogenating the product. Analysis of the supernatant liquid above the supported catalyst using a gas chromatographic analysis showed 89% of the neophyl groups remaining after reaction of tetra(neophyl)zirconium with titania were displaced as tertiary butyl benzene during hydrogenation.

Ethylene was polymerized according to the procedure described in Example 10 using 4 cc. of the zirconium neophyl hydride titanate on titania catalyst and 340 cc. of decahydronaphthalene saturated with ethylene at 40 psi and 150°C. The weight of recovered solid product was 0.263 g. which is equivalent to 0.163 g. of polymer formed at a rate of 108 g./millimole Zr/hr. Again the superiority of alumina as the support is shown by comparing these results to those achieved in Example 14.

Example 12. Batch Polymerization of Ethylene Using As a Catalyst Zirconium Neophyl Hydride on Magnesium Oxide/Silica.

20 g. of commercially-available magnesium oxide (30%) silica (70%) powder having a surface area of 500 meter$^2$/g. was charged to a vertical reactor and dried at 600°C. in a stream of nitrogen for 4 hrs.

The supported zirconium neophyl hydride catalyst was prepared according to Example 10 by reacting the magnesium oxide/silica with tetra(neophyl)zirconium and hydrogenating the product. Analysis of the supernatant liquid above the supported catalyst using a gas chromatographic analysis technique showed 62.5% of the neophyl groups remaining after reaction between the tetra(neophyl)zirconium and magnesium oxide/silica were displaced as tertiary butyl benzene during the hydrogenation.

Ethylene was polymerized according to Example 10 using 5 cc. of the supported zirconium neophyl hydride catalyst and 340 cc. of decahydronaphthalene saturated with ethylene at 40 psi and 150°C. The weight of solid product recovered was 0.346 g. which is equivalent to 0.221 g. of polymer formed at a rate of 118 g./millimole Zr/hr. Again, the superiority of alumina as support is shown by comparison of this result with that of Example 14.

Example 13. Batch Polymerization of Ethylene Using as Catalyst Titanium Neophyl Hydride Aluminate on Alumina.

1 g. of activated and partially-hydrated alumina prepared as in Example 7 was suspended in 38.5 cubic centimeters of decahydronaphthalene and reacted with 1.5 cubic centimeters of 0.2 M tetra(neophyl)titanium in benzene. After 20 minutes the color of the solids was light green and the color of the supernatant liquid yellow.

The supported neophyl titanium aluminate was hydrogenated for 20 min. at 100°C. using 40 psi hydrogen as in Example 10. Analysis of the supernatant liquid after hydrogenation showed approximately 60% of the neophyl groups originally remaining on the titanium after reaction between the tetra(neophyl)titanium and alumina were displaced during hydrogenation.

The polymerization of ethylene was brought about according to Example 10 by adding 4 cubic centimeters of the titanium neophyl hydride aluminate on alumina catalyst slurry to 340 cubic centimeters of decahydronaphthalene saturated with ethylene at 150°C. and 40 psi. After 3 minutes the reaction was quenched with 2 cubic centimeters of isopropanol. After washing and drying, 0.949 g. of solid product was recovered. This is equivalent to 0.849 g. of polyethylene. The rate of polymer formation was 565 g./millimole Ti/hr. While the rate of polymerization here is fairly good although not as high as when zirconium is used (cf. Example 14), the polymer was deeply colored by the titanium catalyst residue and proved difficult to make white by oxidation of the titanium residue.

Example 13-A. Preparation of Tetra(neophyl)Titanium.

Magnesium turnings (36.5 g., 1.5 mols) were charged to a 1 liter, 3-necked flask fitted with a stirrer, $N_2$ inlet, $N_2$ exit connected to a mineral oil bubbler and a 250 cc. dropping funnel. The flask was swept with $N_2$ for 24 hours to remove air and moisture. Then one crystal of iodine and 115 cubic centimeters of diethyl ether were added. When the iodine had reacted 84.3 g. (0.5 mols) of neophyl chloride dissolved in 115 cubic centimeters of dry toluene was added dropwise. The reaction mixture was maintained at about 35°C.–40°C. until all of the neophyl chloride had been added. The reaction was allowed to stir for 1 hour at 27°C. after all of the neophyl chloride had been added.

The Grignard reagent was transferred to a 2 liter flask swept with a stream of dry $N_2$. The unreacted magnesium was washed with 300 cc. of toluene. The washing was added to the Grignard solution which was then cooled to −60°C. and 19 g. (0.1 mols) of titanium tetrachloride dissolved in 50 cubic centimeters of toluene was added through a dropping funnel. The slurry was stirred for 1 hour and allowed to warm to 25°C., then transferred to an inert atmosphere dry box and filtered through a 1 inch bed of dried "Celite" diatomaceous earth. The filtrate was evaporated and the residue dissolved in 100 cubic centimeters of hexane. Crystals of tetra(neophyl)titanium formed on cooling to −35°C. The yellow-green crystals were separated by filtration and recrystallized from hexane to yield 36 g. of tetra(neophyl)titanium. The crystals were purified by recrystallization from hexane. The purified tetra(neophyl)titanium was found to melt at 82.5°C. by DSC melting point determination in $N_2$. Elemental analysis of this product gave C = 81.03%, H = 9.0% theory for tetra(neophyl)titanium, C = 82.7%, H = 9.0%.

Example 14. Batch Polymerization of Ethylene Using as a Catalyst Zirconium Neophyl Hydride Aluminate on Alumina.

The zirconium neophyl hydride aluminate catalyst was prepared according to Example 13 except that 0.3 millimoles of tetra(neophyl)zirconium was used in the reaction with 1 g. of alumina instead of tetra(neophyl)titanium.

The supported neophyl zirconium aluminate was hydrogenated according to Example 13 at 100°C. for 20 min. at 40 psi. Gas chromatographic analysis of the supernatant liquid above the supported catalyst showed 88% of the neophyl groups remaining after reaction of tetra(neophyl)zirconium and alumina were displaced as tertiary butyl benzene during hydrogenation.

The polymerization of ethylene was brought about according to Example 13 by adding 4 cubic centimeters of supported catalyst slurry containing 0.1 g. of alumina and 0.03 millimoles of Zr to 340 cubic centimeters of decahydronaphthalene saturated with ethylene at 150°C and 40 psi. After 3 minutes the reaction was quenched with 2 cubic centimeters of isopropanol. The recovered product weighed 1.16 g. This is equivalent to 1.06 g. of polyethylene formed at a rate of 707 g./millimole Zr/hr., a substantially higher rate than in any of the directly-comparable examples where alumina was replaced by other supports.

Example 15. Batch Polymerization of Propylene Using As a Catalyst Zirconium Neophyl Hydride Aluminate on Alumina.

The zirconium neophyl hydride aluminate catalyst was prepared by addition of 0.2 mM of tetra(neophyl)zirconium in 1 cubic centimeter of benzene to a suspension of 0.5 g. of alumina (activated as in Example 1) in 100 cubic centimeters of hexane. The supported neophyl zirconium aluminate was hydrogenated by reaction with hydrogen at 20 psi for 20 minutes at 50°C. The hydrogen was vented and propylene added to the catalyst at 40 psi and 55°C. After 1 hr. the reaction mixture was set aside to stand for 16 hours at 25°C. The solid product was separated by filtration and dried in a vacuum oven for 16 hrs. at 80°C. The recovered product weighed 1.0 g. of which 0.5 g. was $Al_2O_3$.

The filtrate was evaporated to dryness on a steam bath and the residue from the filtrate dried in a vacuum oven to yield 0.36 g. of a rubbery polypropylene having an inherent viscosity determined as a 0.1% solution in decahydronaphthalene at 130°C., of 4.95.

Partial extraction of the solid product contaminated with $Al_2O_3$ by boiling with 50 cc. of toluene yielded crystalline polypropylene, recrystallized from toluene, having a crystalline melting point of 162°C., as determined by DSC, and an inherent viscosity of 4.95 when measured as a 0.1% solution in decahydronaphthalene at 130°C.

Example 16. Batch Copolymerization of Ethylene and Propylene With a Zirconium Neophyl Hydride Aluminate on Alumina Catalyst.

The zirconium neophyl hydride aluminate catalyst was prepared by reaction of 0.8 mM of tetra(neophyl)zirconium with 2 grams of alumina (activated according to Example 1) in 40 cubic centimeters of decahydronaphthalene. The supported neophyl zirconium aluminate was reacted with hydrogen at 40 psi for 10 minutes at 100°C. The catalyst slurry turned brown immediately.

5.69 grams of the slurry was sealed in a glass ampoule and the ampoule placed in a stainless steel reactor with two stainless steel balls. The reactor was sealed and charged with 50 g. of propylene, warmed to 25°C. and pressured to 500 psi with ethylene. The catalyst ampoule was broken and the polymerization allowed to proceed for 1 hr. The copolymer recovered from the reactor after drying at 80°C. for 16 hrs. weighed 6.4 g. and was found to have a propylene content of 20.15% by weight as determined by infrared analysis. The catalyst activity was 58.2 g. copolymer/millimole Zr/hr. This copolymer was rubbery.

As is well known, the tetra(hydrocarbyl)zirconium compounds are readily prepared by reaction of $ZrCl_4$ with the appropriate Grignard reagents. However, tetra(neophyl)zirconium has not previously been described. Its preparation is illustrated by the following Example 17:

EXAMPLE 17. Preparation of Tetra(neophyl)Zirconium. Zirconium.

Magnesium turnings (48.6 g., 2.0 moles) were charged into a 2-liter, 3-necked glass flask fitted with a stirrer, $N_2$ inlet, $N_2$ exit connected to a mineral oil bubbler, and 500 cc. dropping funnel. The flask was swept with $N_2$ overnight to remove air and moisture. Then 160 cc. of dry, deoxygenated diethyl ether was added. A crystal of iodine was added to activate the Mg surface, and then 118 g. (0.7 moles) of neophyl chloride dissolved in 160 cc. of dry toluene was added dropwise. The reaction mixture was continuously stirred and maintained at 35°-40°C. until all of the neophyl chloride had been added. The reaction mixture turned brown during this period. After 1 hour, a 5 cc. aliquot of the supernatant solution was removed from the reaction mixture, neutralized with 20 cc. of 0.1 M aqueous HCl and back-titrated to a pink phenolphthalein end point with 5 cc. of 0.2 M aqueous NaOH. The concentration of the Grignard reagent was therefore found to be 2 molar.

The Grignard reagent was transferred to a 2-liter flask swept with a stream of dry $N_2$. The unreacted Mg was washed with 400 cc. of dry toluene and the washing added to the Grignard solution. The Grignard solution (neophyl magnesium chloride) was cooled to −10°C. and then 40 g. of 97% $ZrCl_4$ (0.166 moles) was added through a solids addition tube. The slurry was stirred for 1 hour and warmed to 50°C., then transferred to an inert atmosphere box and filtered through a 1-inch bed of dried "Celite" diatomaceous earth. The filtrate was concentrated by evaporation. Crystals of solid tetra(neophyl)zirconium formed upon cooling. The yield of this product was about 70 g. The crystals were purified by recrystallization from n-hexane. The purified tetra(neophyl)zirconium product was found to melt at 67°-68°C. by observation on a Fisher-Johns hot-stage and 69°C. by DTA (differential thermal analysis) melting point determination in $N_2$. Elemental analysis of this product gave C = 75.85%, H = 8.20%; theory for tetra(neophyl)zirconium, C = 76.99%, H = 8.40%.

VI. ANALYTICAL METHODS a. The zirconium neophyl hydride aluminate catalyst of the above examples was examined by Electron Spin Resonance (E.S.R.) using a modified Varian X band spectrometer at 25°C. The sample was charged to a quartz tube in an inert atmosphere box and introduced into the spectrometer probe. The sample gave rise to a single E.S.R. line at $g = 1.995$ having a width of 8 gauss. The E.S.R. line displayed an asymmetrical line shape typical of a powder spectrum corresponding to a paramagnetic complex having an axially-symmetric g tensor typical of a zirconium III species. [Reference D. A. Miller, R. D. Bereman; Co-ord. Chem. Reviews, 9, 107 (1972)]

b. The melting points of the polyolefins prepared were accurately determined by differential thermal analysis according to the general method described in the chapter "Application of Differential Thermal Analysis to High Polymers, Organic Analysis " Volume IV, page 361, Interscience Publishers, Inc. (1960). Using a differential thermal analyzer, e.g., a Du Pont Model 900 DTA, fitted with a differential scanning calorimeter (DSC) cell adjusted to a heating rate of 5°C. per minute using an empty aluminum pan as a reference, a sample of the polymer was heated in an aluminum pan to 20°C. above its melting point. The sample was cooled approximately 15 minutes until it reached a temperature of about 50°C. and then reheated again at 5°C. per minute, and the melting point observed. This procedure gives comparable melting points for polyolefins to those obtained by visual observation using a hot-stage microscope equipped with crossed polarizers in accord with the ASTM procedure Designation D2117-64 for the determination of the melting point of semicrystalline polymers.

c. One method for molecular weight determination is the measurement of inherent viscosity of the polymer in solution. The measurement of inherent viscosity bears a direct relationship to the number average molecular weight for each class of polyolefin and it was used in the above examples to characterize the polypropylenes produced in the examples. The inherent viscosity ($\eta_i$) of the polypropylene was measured by dissolving 0.05 g. of the polyolefin in 50 milliliters of decahydronaphthalene at 170°C. The solution was filtered and transferred to an Ostwald viscometer and the viscosity of the polymer solution and the decahydronaphthalene solvent measured at 130°C. by noting the time required to pass the same volume of each material through the viscometer.

The inherent viscosity ($\eta_i$) was then calculated by using the following formula:

$$\eta_I = \frac{2.303 \log [\text{flow time for sol'n/flow time for solvent}]}{\text{gm. of polymer in 100 ml. of solvent}}$$

The inherent viscosity may be correlated with the number average molecular weight of the linear polyolefin, e.g., an inherent viscosity of 1.0 corresponds to a number average molecular weight of 180,000, an $\eta_i$ of 5 corresponds to 750,000 and an $\eta_i$ of 10 corresponds to 1,800,000 for the polypropylene polymers disclosed herein.

d. The weight average molecular weight of the polyolefin products herein may be measured by the classical methods of light scattering. However, in the case of the linear polyethylene products of the examples, the weight average molecular weights of the products were determined from a previously established correlation between melt flow (ASTM 1238-6ST Condition E) and weight average molecular weight as determined by light scattering, e.g., a melt flow of 1 corresponds to a weight average molecular weight ($\overline{M}_w$) of 140,000 and a melt flow of 3.5 to $\overline{M}_w = 100,000$.

e. The zirconium hydrocarbyl hydride aluminate catalysts of the examples were analyzed for hydride by reaction with $D_2O$ and the gases liberated were analyzed by mass spectrograph which measured the DH and $D_2$ evolved according to the following reactions:

(1) 

(2) 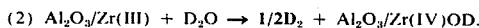

I claim:

1. In a process for the polymerization or copolymerization of at least one 1-olefin monomer to produce linear, solid polyolefins of high molecular weight by the use, as polymerization catalyst, of a transition metal composition, in which the transition metal is a metal of Group IV(a) of the Periodic Table of the Elements, the improvements which consists essentially of employing as the transition metal composition a transition metal hydrocarbyl hydride aluminate supported on alumina in which said hydrocarbyl radical is selected from the group consisting of radicals having the structure $RCH_2-$ in which $R-$ is aryl, aralkyl in which no hydride radical is attached to the carbon atom bonded to the methylene group, or tertiary butyl, and in which from about 60% to substantially 100% of the radicals other than aluminate bonded to the transition metal are hydride radicals.

2. A process according to claim 1 in which the transition metal hydrocarbyl hydride aluminate is zirconium neophyl hydride aluminate.

3. A process according to claim 1 in which the transition metal hydrocarbyl hydride aluminate is zirconium benzyl hydride aluminate.

4. A process according to claim 1 in which the olefin monomer consists solely of ethylene.

5. A process according to claim 1 in which the olefin monomer consists of a mixture of ethylene and propylene in which the mole percent of propylene is greater than 50%.

6. A process according to claim 1 in which the olefin monomer consists of a mixture of ethylene with up to 15 mole percent of a higher 1-olefin having from 4 to 10 carbon atoms.

7. A process according to claim 1 in which the olefin monomer consists solely of propylene.

8. In a continuous solution process for the polymerization of ethylene to produce a linear, solid, crystalline polymer of ethylene in which a solution in an inert hydrocarbon solvent of polymerizable olefins comprising at least 85 mole percent ethylene and from 0 to 15 mole percent of another 1-olefin having from 4 to 10 carbon atoms in the monomer molecule is continuously passed into one or more agitated polymerization zones maintained at a temperature in the range of 130° to 300°C. maintained under a pressure in the range of 500 to 5000 psi, and the solution of reaction products in continuously withdrawn from the polymerization zone to a catalyst deactivation zone where it is continuously mixed with a substance which reacts to deactivate the catalyst and the hot solution of reaction products is continuously passed from the deactivation zone to a product recovery zone where the polymer of ethylene is separated from the solvents and isolated in solid form, the improvement which (comprises) consists essentially of continuously feeding to the polymerization zone as the polymerization initiator a slurry in hydrocarbon medium of a zirconium hydrocarbyl hydride aluminate supported on alumina, said hydrocarbyl radical being selected from the group having the structure $R-CH_2-$ in which $R-$ is aryl, aralkyl in which no hydride radical is attached to the carbon atom bonded to the methylene group, or tertiary butyl, in which the valence of the zirconium is reduced, at least in part, to three, and from about 90% to substantially 100% of the radicals, other than aluminate bonded to zirconium, are hydride radicals, at a rate sufficient to maintain the temperature constant in the reaction zone under adiabatic conditions and such that the molar ratio of polymerizable olefins to zirconium in the polymerization zone is maintained in the range of 35,000–400,000 to 1.

9. A process according to claim 8 in which the zirconium hydrocarbyl hydride aluminate is zirconium benzyl hydride aluminate.

10. A process according to claim 8 in which the zirconium hydrocarbyl hydride aluminate is zirconium neophyl hydride aluminate.

11. A process according to claim 8 in which the polymerizable olefin fed to the polymerization zone is solely ethylene.

12. A process according to claim 8 in which from 0.001 to 10 moles of $H_2$, dissolved in an inert hydrocarbon solvent, per mole of ethylene is simultaneously fed continuously to the polymerization zone to control and limit the molecular weight of the polymer of ethylene produced.

* * * * *

UNITED STATES PATENT OFFICE
CERTIFICATE OF CORRECTION

PATENT NO. : 3,971,767
DATED : July 27, 1976
INVENTOR(S) : Robert Alton Setterquist It is certified that error appears in the above-identified patent and that said Letters Patent are hereby corrected as shown below:

Column 23, line 26, "improvements" should read --improvement--.

Column 24, line 13, the last word "in" should read --is--.

Column 24, line 21 "(comprises)" should be deleted.

Signed and Sealed this

Twenty-third Day of November 1976

[SEAL]

Attest:

RUTH C. MASON
Attesting Officer

C. MARSHALL DANN
Commissioner of Patents and Trademarks